United States Patent
Ekberg et al.

(10) Patent No.: US 9,930,187 B2
(45) Date of Patent: Mar. 27, 2018

(54) BILLING RELATED INFORMATION REPORTING

(71) Applicant: Nokia Technologies Oy, Espoo (FI)

(72) Inventors: Jan-Erik Ekberg, Vantaa (FI); Mikko Uusitalo, Helsinki (FI); Carl Simon Wijting, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/764,653

(22) PCT Filed: Jan. 31, 2013

(86) PCT No.: PCT/FI2013/050107
§ 371 (c)(1),
(2) Date: Jul. 30, 2015

(87) PCT Pub. No.: WO2014/118423
PCT Pub. Date: Aug. 7, 2014

(65) Prior Publication Data
US 2015/0373204 A1    Dec. 24, 2015

(51) Int. Cl.
| | |
|---|---|
| *H04M 11/06* | (2006.01) |
| *H04M 15/00* | (2006.01) |
| *H04L 9/32* | (2006.01) |
| *G06F 21/12* | (2013.01) |
| *H04W 4/24* | (2018.01) |
| *H04W 12/08* | (2009.01) |

(52) U.S. Cl.
CPC .......... *H04M 15/61* (2013.01); *G06F 21/121* (2013.01); *G06F 21/126* (2013.01); *H04L 9/3271* (2013.01); *H04M 15/54* (2013.01); *H04W 4/24* (2013.01); *H04W 12/08* (2013.01)

(58) Field of Classification Search
CPC ..... H04L 9/3271; H04M 15/54; H04M 15/61; G06F 21/121; G06F 21/126; H04W 12/08; H04W 4/24
USPC .......................... 455/406; 705/44; 713/716
See application file for complete search history.

(56) References Cited

U.S. PATENT DOCUMENTS

| | | |
|---|---|---|
| 2004/0223455 A1 | 11/2004 | Fong et al. |
| 2005/0085234 A1 | 4/2005 | Wang et al. |
(Continued)

FOREIGN PATENT DOCUMENTS

| | | |
|---|---|---|
| CN | 101136826 | 3/2008 |
| CN | 101500233 | 8/2009 |
(Continued)

OTHER PUBLICATIONS

International Search Report for International Application No. PCT/FI2013/050107—Date of Completion of Search: Sep. 20, 2013, 4 pages.
(Continued)

*Primary Examiner* — Charles Shedrick
(74) *Attorney, Agent, or Firm* — Locke Lord LLP

(57) ABSTRACT

Radio communications is performed within a mobile telecommunication network. Billing related information is obtained by radio-physical detection. Within a trusted execution environment, a challenge known by the mobile telecommunication network is obtained; billing related information is received; billing related information is attested; and the attested billing related information is caused to be sent to the mobile telecommunication network.

20 Claims, 2 Drawing Sheets

(56) References Cited

U.S. PATENT DOCUMENTS

| | | |
|---|---|---|
| 2005/0289347 A1 | 12/2005 | Ovadia |
| 2006/0212897 A1 | 6/2006 | Tiedemann, Jr. et al. |
| 2006/0235796 A1* | 10/2006 | Johnson .................. G06Q 20/02 |
| | | 705/44 |
| 2008/0182592 A1 | 7/2008 | Cha et al. |
| 2008/0239103 A1 | 10/2008 | Bocking et al. |
| 2009/0254975 A1 | 10/2009 | Turnbull et al. |
| 2010/0058377 A1 | 3/2010 | Grob et al. |
| 2010/0067604 A1* | 3/2010 | Bhadra .................. H04B 7/024 |
| | | 375/267 |
| 2010/0093355 A1 | 4/2010 | Voyer et al. |
| 2010/0190469 A1 | 7/2010 | Vanderveen et al. |
| 2011/0219427 A1 | 9/2011 | Hilo et al. |
| 2011/0293098 A1 | 12/2011 | Fu et al. |
| 2011/0319069 A1 | 12/2011 | Li |
| 2012/0002681 A1 | 1/2012 | Hirohiko et al. |
| 2012/0005311 A1 | 1/2012 | Livingston et al. |
| 2012/0033563 A1 | 2/2012 | Jazra et al. |
| 2012/0100879 A1 | 4/2012 | Tine et al. |
| 2012/0236713 A1 | 9/2012 | Kakadia et al. |
| 2012/0250666 A1 | 10/2012 | Bhukania |
| 2013/0155847 A1 | 6/2013 | Ying et al. |
| 2013/0165044 A1 | 6/2013 | Xie et al. |
| 2014/0241302 A1 | 8/2014 | Korhonen et al. |
| 2014/0317413 A1* | 10/2014 | Deutsch ................ H04L 9/3271 |
| | | 713/176 |
| 2015/0017707 A1 | 3/2015 | Takahisa |
| 2015/0365814 A1 | 12/2015 | El Ayach et al. |
| 2016/0021567 A1 | 1/2016 | Agiwal et al. |

FOREIGN PATENT DOCUMENTS

| | | |
|---|---|---|
| WO | WO201036611 | 4/2010 |
| WO | WO2010036611 | 4/2010 |
| WO | WO 2010/003464 | 1/2011 |
| WO | WO 2011/109772 | 9/2011 |
| WO | WO2016086144 | 6/2016 |

OTHER PUBLICATIONS

PCT Written Opinion of the International Searching Authority for International Application No. PCT/FI2013/050107—Date of Completion of Opinion: Sep. 20, 2013, 6 pages.

"3rd Generation Partnership Project; Technical Specification Group Service and System Aspects; Security of H(e)NB; (Release 8)", 3GPP TR 33.820, V8.3.0, Dec. 2009, 100 pages.

Extended European Search Report for European Patent Application No. 13873164.1, dated Aug. 1, 2016, 8 pages.

The People's Republic of China Office Action for Application No. 2013800717319; Serial No. 2017113001596270 dated Dec. 5, 2017.

* cited by examiner

Fig. 1
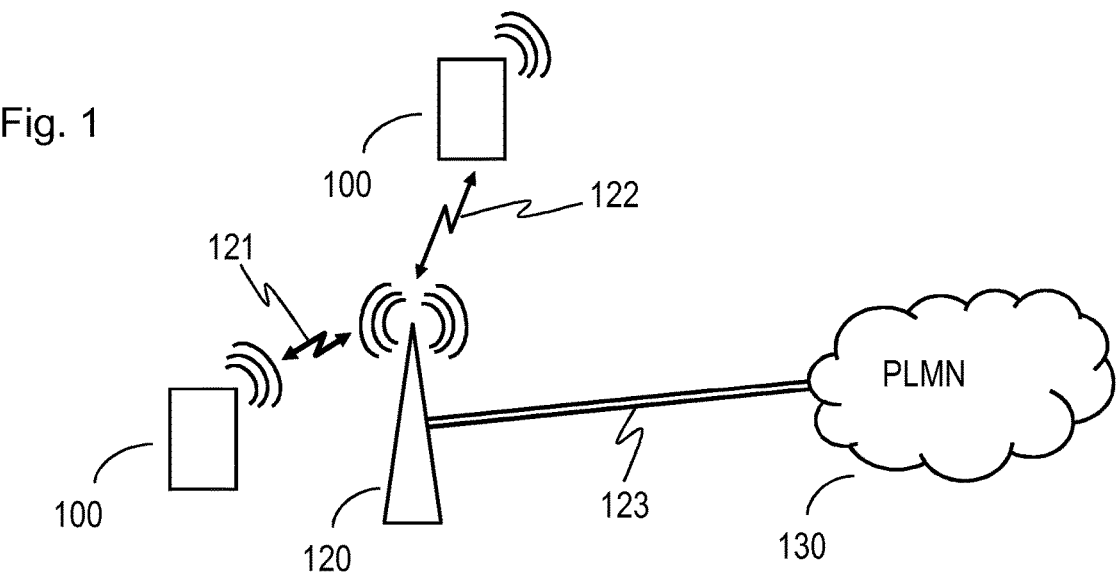
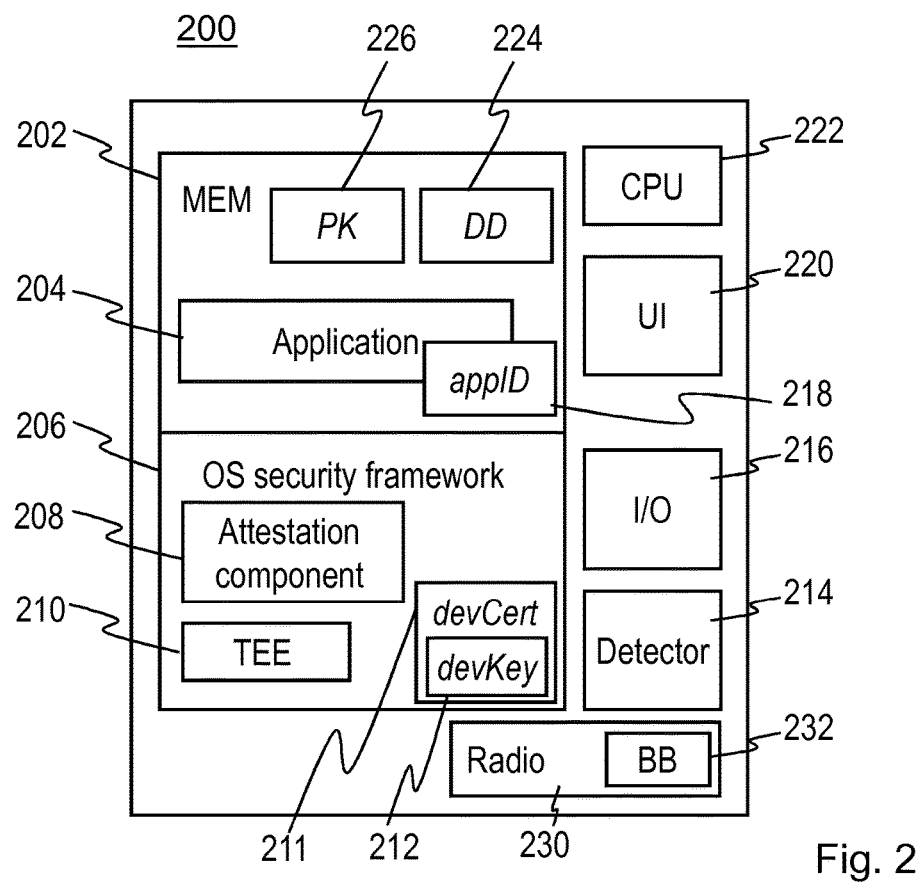
Fig. 2

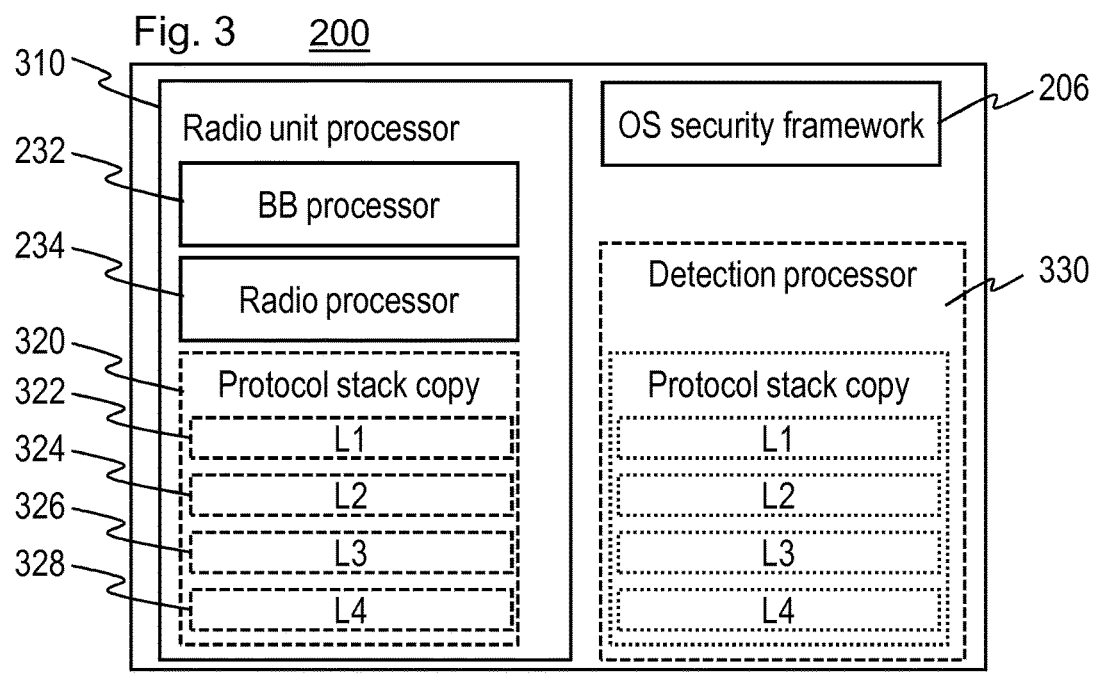
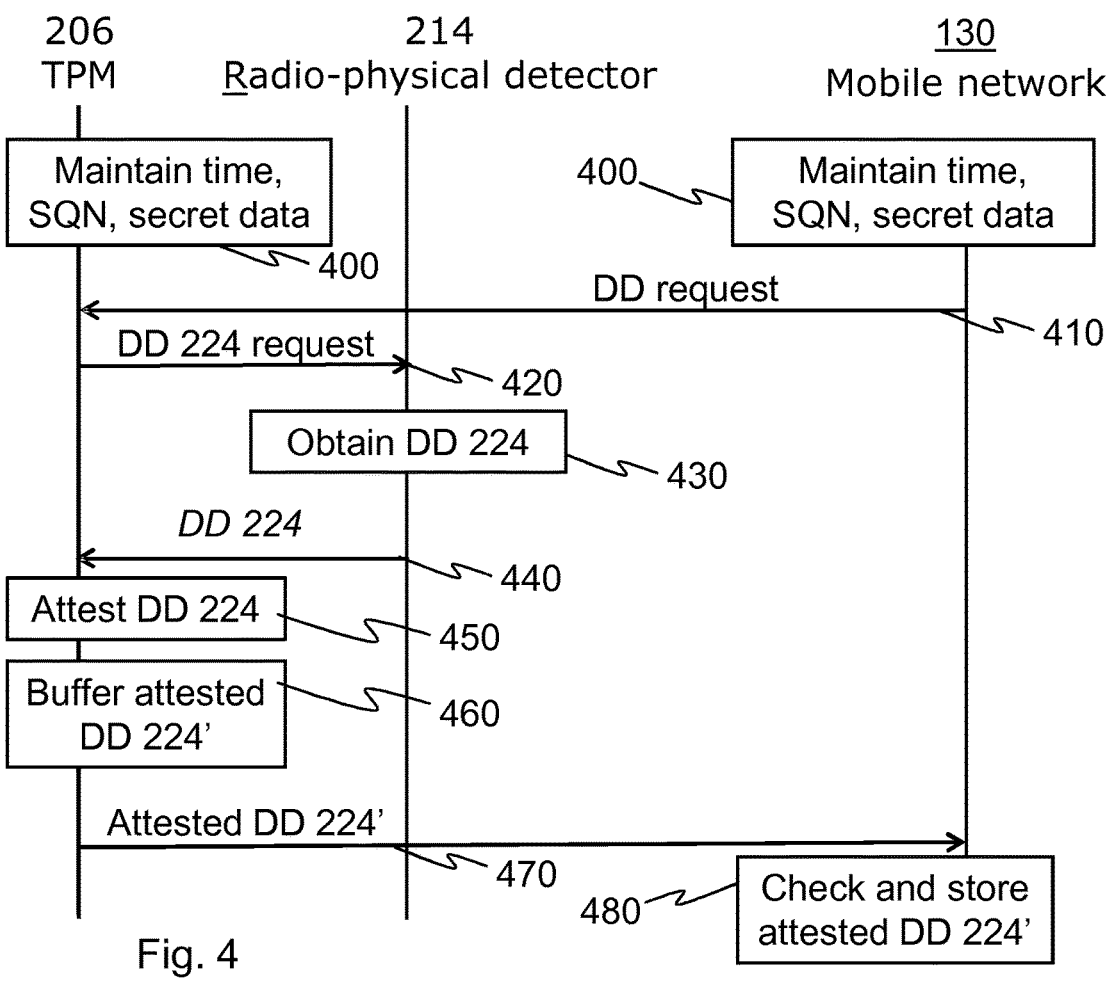

BILLING RELATED INFORMATION REPORTING

TECHNICAL FIELD

The present application generally relates to billing related information reporting. The present application relates in particular, though not exclusively, to attested billing related information reporting for publically accessible base stations located in private premises.

BACKGROUND

Mobile telecommunications applies radio signals. Typical mobile telecommunication networks have many base stations each capable of providing radio resource for concurrent use by many different mobile telephones. Also small cell and femtocell base stations exist for forming very small range cells using residential broadband connections for relaying mobile data between a mobile network operator and mobile devices connected to the base station.

In mobile telecommunications, the use of network resources is typically charged by the network operator in a subscription bill or using a prepayment mechanism. In some cases, the hosting of privately located base station is compensated for the person who hosts the base station in her premises. For such compensation, the operator is informed about the use and availability of the privately located base station.

SUMMARY

According to a first example aspect of the invention, there is provided an apparatus comprising:
  a communication interface for communicating with a radio communication unit that is configured to perform radio communications within a mobile telecommunication network;
  a radio-physical detector for obtaining billing related information from the radio communication unit; and
  a trusted platform module configured to:
    obtain a challenge known by the mobile telecommunication network;
    receive billing related information from the radio-physical detector;
    attest the billing related information; and
    cause the apparatus to send the attested billing related information to the mobile telecommunication network.

The challenge may comprise network time of the mobile telecommunication network. Alternatively, or additionally, the challenge may comprise a random code.

The apparatus may further comprise a first memory. The apparatus may further comprise first computer executable program code stored in the first memory. The apparatus may further comprise a first processor configured to control the operation of the trusted platform module based on the first computer executable program code.

The trusted platform module may comprise a second memory. The trusted platform module may further comprise second computer executable program code stored in the second memory. The trusted platform module may further comprise a second processor configured to control the operation of the trusted platform module based on the second computer executable program code.

The apparatus may further comprise a communication interface configured to exchange information over a broadband connection with the mobile telecommunication network. The apparatus may further comprise a base station for the mobile telecommunication network. The radio-physical detector may be configured to indicate operation of the base station. The billing related information may comprise the indication of the operation of the base station.

The apparatus may comprise a mobile communication device configured to communicate through the mobile telecommunication network. The radio-physical detector may be configured to indicate operation of a base station from which the mobile communication device receives radio signals. The billing related information may comprise the indication of the operation of the base station. The radio-physical detector may be configured to indicate the operation of the base station from which the mobile communication device receives radio signals that indicate a need for attesting and sending the indication of the operation of the base station to the mobile telecommunication network.

The apparatus may be configured to send in batches different pieces of attested billing related information. The trusted platform module may be configured to store received billing related information for batch sending of the attested billing related information to the mobile telecommunication network. The trusted platform module may be configured to buffer received billing related information in attested form.

According to a second example aspect of the invention, there is provided a system comprising:
  a radio communication unit configured to perform radio communications within a mobile telecommunication network; and
  an apparatus comprising:
    a communication interface for communicating with the radio communication unit;
    a radio-physical detector for obtaining billing related information from the radio communication unit; and
    a trusted platform module configured to:
      obtain a challenge known by the mobile telecommunication network;
      receive billing related information from the radio-physical detector;
      attest the billing related information; and
      cause the apparatus to send the attested billing related information to the mobile telecommunication network.

According to a third example aspect of the invention, there is provided a method comprising:
  communicating with a radio communication unit that is configured to perform radio communications within a mobile telecommunication network;
  obtaining by radio-physical detection billing related information from the radio communication unit; and
  within a trusted execution environment:
  obtaining a challenge known by the mobile telecommunication network;
  receiving billing related information;
  attesting billing related information; and
  causing sending of the attested billing related information to the mobile telecommunication network.

According to a fourth example aspect of the invention, there is provided an apparatus, comprising:
  at least one processor; and
  at least one memory including computer program code;
  the at least one memory and the computer program code configured to, with the at least one processor, cause the apparatus to perform at least the following:

communicating with a radio communication unit that is configured to perform radio communications within a mobile telecommunication network;
obtaining by radio-physical detection billing related information from the radio communication unit; and
within a trusted execution environment:
obtaining a challenge known by the mobile telecommunication network;
receiving billing related information;
attesting billing related information; and
causing sending of the attested billing related information to the mobile telecommunication network.

According to a fifth example aspect of the invention, there is provided a computer program, comprising:
code for communicating with a radio communication unit that is configured to perform radio communications within a mobile telecommunication network;
code for obtaining by radio-physical detection billing related information from the radio communication unit; and
code for performing within a trusted execution environment:
obtaining a challenge known by the mobile telecommunication network;
receiving billing related information;
attesting billing related information; and
causing sending of the attested billing related information to the mobile telecommunication network;
when the computer program is run on a processor.

According to a sixth example aspect of the invention, there is provided a computer-readable medium encoded with instructions that, when executed by a computer, cause:
communicating with a radio communication unit that is configured to perform radio communications within a mobile telecommunication network;
obtaining by radio-physical detection billing related information from the radio communication unit; and
within a trusted execution environment:
obtaining a challenge known by the mobile telecommunication network;
receiving billing related information;
attesting billing related information; and
causing sending of the attested billing related information to the mobile telecommunication network.

Any memory medium hereinafter or hereinbefore may comprise a non-transitory digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory, polymer memory or any combination thereof. The memory medium may be formed into a device without other substantial functions than storing memory or it may be formed as part of a device with other functions, including but not limited to a memory of a computer, a chip set, and a sub assembly of an electronic device.

Different non-binding example aspects and example embodiments of the present invention have been illustrated in the foregoing. The foregoing example embodiments are used merely to explain selected aspects or steps that may be utilized in implementations of the present invention. Some example embodiments may be presented only with reference to certain example aspects of the invention. It should be appreciated that corresponding example embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:
FIG. 1 shows an example system according to an example embodiment;
FIG. 2 shows an architectural overview of an apparatus suited for operating in some example embodiments as a mobile station or as a base station;
FIG. 3 shows a block diagram an arrangement of an example embodiment; and
FIG. 4 shows a signaling chart according to an example embodiment.

DETAILED DESCRIPTION OF THE DRAWINGS

An example embodiment of the present invention and its potential advantages are understood by referring to FIGS. 1 through 4 of the drawings.

FIG. 1 shows an example system according to an example embodiment. The system comprises a plurality of mobile telecommunication devices 100 such as GSM, UMTS, CDMA-2000 or LTE enabled mobile telecommunication devices or mobile stations. Mobile stations 100 can be, for example, any of a portable device such as a mobile phone, a smartphone, a portable gaming device, a navigator, a personal digital assistant, a tablet computer, laptop computer, and/or a portable web browser.

The system further comprises a base station 120 that in this example is a small cell station that is privately owned and/or located in private premises such as a home or office. The base station 120 is capable of forming a cell for a public land mobile network 130. In operation, the base station 120 can form radio connections 121 with mobile stations 100 within its range. For communication with the public land mobile network 130, the base station 120 can use a broadband connection 123 such as an ADSL, VDSL or LAN connection. The mobile stations 100 and/or the base station 120 can be also equipped with a positioning unit configured to use satellite positioning, e.g. global positioning system (GPS) and/or a network-based positioning service.

FIG. 2 illustrates an architectural overview of an apparatus 200 suited for operating in some example embodiments as the mobile station 100 or as the base station 120. The apparatus 200 generally has capabilities for processing information, for performing cryptographic operations and for communicating with other entities, at least intermittently when in contactless or contacting access therewith, or with a related communication element.

The apparatus 200 has a processing circuitry, e.g. for cryptographic operations, such as a processor 222, hereinafter referred to as the processor. The apparatus 200 has a trusted platform module (TPM) such as an operating system (OS) security framework 206, comprising an attestation component 208 for attesting, or ascertaining or securing, information such as billing related information. In this document, the billing related information refers, depending on example embodiment in question, to one or more of the following: uptime; cell range; quality of the radio connection (121, 123) such as bit error rate or signal to noise ratio, latency, jitter and/or data rate; amount of transmitted data; any physical layer information; any data link layer information; and/or location of the base station 120. The OS security framework comprises an isolated Trusted Execution Environment (TEE) 210 and a device specific signing key devKey 212 certified with a device specific certificate devCert 211 by a trusted authority, e.g. the manufacturer of the apparatus 200.

The apparatus 200 further comprises a communication interface 216, i.e. an input/output (I/O)-interface and a memory 202 coupled to the processor 222. It shall be understood that any coupling or connecting in this document refers to functional or operational coupling; there may be intervening components or circuitries in between coupled elements unless expressly otherwise described.

The memory 202 comprises a work memory and a non-volatile memory such as a read-only memory, flash memory, optical or magnetic memory or any combination thereof. In the memory 202, typically at least initially in the non-volatile memory, there is stored software such as applications 204 operable to be loaded into and executed by the processor 222. The software, or the application 204, comprises in an example embodiment, one or more software modules and can be in the form of a computer program product that is software stored in a memory medium. Furthermore, in an example embodiment, the memory 202 comprises stored therein billing related information or detector data DD 224 and a public part of the application specific key pair, or public key, PK 226. In a further example embodiment, the application 204 comprises an application identifier appID 218 assigned to the application by a trusted application infrastructure, such as an official application store of a service provider or manufacturer of the device 200. The application identifier appID 218 is used in one example embodiment for checking whether the application 204 in question should be allowed to run in the apparatus 200 so as to restrain attacks by malicious applications against the apparatus 200.

The I/O interface 216 is configured to provide local communications over one or more local links. The links may be wired and/or wireless links. The I/O interface 216 may further or alternatively implement telecommunication links suited for establishing links with other users or for data transfer, e.g. using the Internet. Such telecommunication links may be links using any of: wireless local area network links, Bluetooth, ultra-wideband, cellular or satellite communication links. The I/O interface 216 may be integrated into the apparatus 200 or into e.g. an adapter, card or that may be inserted into a suitable slot or port of the apparatus 200. While FIG. 2 shows one I/O interface 216, the apparatus may comprise a plurality thereof.

The processor 222 comprises, for instance, a central processing unit (CPU), a microprocessor, a digital signal processor (DSP), a graphics processing unit, an application specific integrated circuit (ASIC), a field programmable gate array, a microcontroller or a combination of such elements. FIG. 2 shows one processor 222, but the apparatus 200 may comprise a plurality thereof.

As mentioned in the foregoing, the memory 202 may comprise volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage, or a smart card or any combination thereof. In some example embodiments, only volatile or non-volatile memory is present in the apparatus 200. Moreover, in some example embodiments, the apparatus comprises a plurality of memories. In some example embodiments, various elements are integrated. For instance, the memory 202 can be constructed as a part of the apparatus 200 or e.g. inserted into a slot or port. Further still, the memory 202 may serve the sole purpose of storing data, or it can be constructed as a part of an apparatus serving other purposes, such as processing data.

The apparatus 200 further has a user interface (UI) 220, a radio communication unit 230 or radio unit in short that comprises a base band part 232 and a radio-physical detector 214 or detector in short for monitoring operation of the radio unit 230. The apparatus 200 has access to detector data DD 224 obtained by detector 214 integrated therewith or to detector data obtained from an external source, in an example embodiment through the I/O interface 216 and/or through the detector 214 and/or through the application 204. A skilled person appreciates that in some example embodiments, the detector 214 is any functional unit or element that has access to detector or measurement data either directly or indirectly, e.g. through an external source. Furthermore, in some example embodiments, the detector data 224 DD comprises any data, for example stored in the memory 202, that is to be attested according to an example embodiment. In an example embodiment, the billing related information is the detector data 224.

FIG. 3 shows a block diagram an arrangement of an example embodiment. In FIG. 3, the detector 214 is collectively formed of a radio unit processor 310 such as a base band processor 312 and/or radio control processor 314 and of a protocol stack copy 320 comprising information of one or more of lower-most protocol layers 322, 324, 326, 328 of the OSI model (L1 i.e. physical layer, L2 i.e. data link layer, L3 i.e. network layer and L4 i.e. transport layer). Depending on implementation, the base band processor 312 can process e.g. layers L1 and L2; L1 to L3; or L1 to L4. The radio unit processor 310 is configured to maintain the protocol stack copy 320 updated to correspond with that of the apparatus 200 (not shown). The protocol stack copy is maintained in an example embodiment within the OS security framework 206. In an example embodiment, signaling lines between the source of the protocol stack copy 320 and the OS security framework 206 are protected against tampering e.g. by concealing inside a printed circuit board; modulating into form that is difficult to access with household equipment; and/or by using cryptographic integrity protecting such as encryption.

In another example embodiment, a detection processor 330 is coupled to the baseband circuitry of the apparatus 200 e.g. through the base band processor 232, radio processor 234. The detection processor 330 comprises, for example, a central processing unit (CPU), a microprocessor, a digital signal processor (DSP), a graphics processing unit, an application specific integrated circuit (ASIC), a field programmable gate array, a microcontroller or a combination of such elements. The detection processor can be configured to maintain the protocol stack copy 320 or to otherwise feed detector data to the OS security framework 206.

In an example embodiment, the apparatus 200 is configured to prevent user installation of applications that could access the protocol stack copy 320 for inhibiting software based tampering of the billing related information.

In one example embodiment, the detector data 224 is fed to the OS security framework 206 via the memory 202.

A skilled person appreciates that in addition to the elements shown in FIG. 2, the apparatus 200 may comprise other elements, such as microphones, displays, as well as additional circuitry such as further input/output (I/O) circuitries, memory chips, application-specific integrated circuits (ASIC), processing circuitry for specific purposes such as source coding/decoding circuitry, channel coding/decoding circuitry or ciphering/deciphering circuitry. Additionally, the apparatus 200 may comprise a fixed or portable power supply such as disposable or rechargeable battery (not shown) for powering the apparatus.

FIG. 4 shows a signaling chart according to an example embodiment. In beginning, both the trusted platform module 206 and the mobile network maintain 400 some secret information that will be used for attesting detector data 224. The secret information comprises various one or more items depending on example embodiment, such as common time, sequence number, one or more encryption keys, and/or one or more encryption certificates. The mobile network 130 requests for attested detector data 224 from the apparatus 200. The attested detector data request contains in an example embodiment a challenge and/or time stamp set by the mobile network 130.

The apparatus 200 or more particularly the trusted platform module 206 requests 420 the DD 224 from the radio-physical detector 214. The radio-physical detector 214 obtains 430 the DD 224 and provides 440 the DD 224 to the trusted platform module 206. The trusted platform module 206 then buffers 460 the attested DD 224' in one example embodiment. The buffering may be limited so that only given ones of attested DD 224' are maintained e.g. using first in-first out principle or so that when a maximum number of attested DD 224' are stored, intermediate attested DD 224' are deleted in such an order that a representative group of attested DD 224' spanning over a period of time since the first DD 224' to the present time is maintained until the buffered attested DD 224' can be sent to the mobile network in step 470.

It is to be understood that in some other example embodiments, the radio-physical detector 214 can be configured to continually feed the DD 224 to the trusted platform module 206 which can then be either configured to neglect the DD 224 when not in the need of any or to buffer all received DD 224 using the memory 202.

Armed with the DD request 410 and with the DD 224, the trusted platform module attests 450 the obtained DD 224 e.g. using the system time, challenge, sequence number and/or the public key PK, or a hash thereof.

The resulting attested DD 224' is sent 470 to the mobile network 130. The mobile network 130 then cryptographically checks the attested detector data DD and stores the DD 224 carried by the attested DD 224' if the cryptographic checking is passed, 480. Using the stored DD 224, the network 130 can then according to different example embodiments cause payment of an award to the party who hosts the apparatus 200 and/or to reduce network usage bills of that party.

Various implementation options of different example embodiments are next further discussed.

In one example embodiment, the apparatus obtains the system time from the network 130 e.g. when connected through the broadband connection 123 with the network 130. In another example embodiment, the network 130 provides the base station with its time offset in comparison to a common reference time that is available to the base station 120 e.g. through a network time protocol (NTP) server outside the network 130.

Instead or in addition to the DD 224 request 420, the detector data 224 can be obtained continually e.g. with fixed intervals of N seconds, N being 0.1 to 300, e.g. 1, 2 or 5. The detector data 224 can alternatively or additionally be formed responsively to meeting a predetermined threshold such as an event occurring. The event can also be defined by the DD request 410 received from the mobile network 130. The event can be e.g. signaling with a mobile station 100, forming a connection 121, 123 with a mobile station or terminating of a connection 121, 123 with the mobile station 100. In addition to the examples described in the foregoing, the detector data can comprise the number of present connections with different mobile stations 100, the quality of service level of the present connections with different mobile stations, and/or the media coding applied with one or more of the different mobile stations. For example, the base station 120 is configured in one example embodiment to perform conversion between flash coding and html presentation for benefit of non-flash enabled mobile stations with a computational burden on the base station 120 and/or transcoding between different video and/or audio coding formats. Characteristics such as statistical characteristics can be formed in this step.

The DD request 410 of the mobile network 130 comprises in an example embodiment one or more recurring or long-term reporting criteria. The reporting criteria contain e.g. any of elapsed time since previous report; transferred data since previous report; accrued billing units calculated based on e.g. computation cost, energy consumption, data transfer and/or data rate; and number of mobile stations connected with the base station.

Without in any way limiting the scope, interpretation, or application of the appended claims, a technical effect of one or more of the example embodiments disclosed herein is providing billing related information attestation for small cell base stations. Another technical effect of one or more of the example embodiments disclosed herein is hindering malicious tampering of billing related information for financial advantage, where compensation is provided for a party hosting a base station the billing related information of which is sent to the network through an unsecure environment. Another technical effect of one or more of the example embodiments disclosed herein is the ability to verify the operation of a base station by mobile stations within its range.

It will be understood that each operation of the flowchart, and/or combinations of operations in the flowchart can be implemented by various means. Means for implementing the operations of the flowchart, combinations of the operations in the flowchart, or other functionality of the example embodiments described herein may comprise software, hardware, application logic or a combination of software, hardware and application logic. The application logic, software or an instruction set is maintained on any one of various conventional computer-readable media. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. An apparatus comprising:
    a communication interface for communicating with a radio communication unit that is configured to perform radio communications with a base station capable of forming a cell for relaying mobile data between the apparatus and a mobile telecommunication network;
    a radio-physical detector for obtaining billing related information from the radio communication unit; and
    a trusted platform module including a trusted execution environment configured to attest the billing related information by encrypting the billing information to be sent to the mobile telecommunication network, the trusted platform configured to:
    obtain a challenge known by the mobile telecommunication network;
    receive billing related information from the radio-physical detector;
    attest the billing related information by encrypting the billing information, in response to the challenge; and
    cause the apparatus to send the attested billing related information to the mobile telecommunication network;
    the apparatus further comprising a mobile communication device configured to communicate through the base station with the mobile telecommunication network,
    wherein the radio-physical detector is configured to produce an indication of operation of the base station from which the mobile communication device receives radio signals and the billing related information comprises the indication of the operation of the base station.

2. The apparatus of claim 1, wherein the radio-physical detector comprises a memory configured to maintain a protocol stack copy.

3. The apparatus of claim 2, further configured to prevent user installation of applications that could access the protocol stack copy.

4. The apparatus of claim 2, wherein the protocol stack copy comprises a copy of physical layer information.

5. The apparatus of claim 2, wherein the protocol stack copy comprises a copy of data link layer information.

6. The apparatus of claim 2, wherein the protocol stack copy comprises a copy of network layer information.

7. The apparatus of claim 2, wherein the protocol stack copy comprises a copy of transport layer information.

8. The apparatus of claim 1, further comprising base band circuitry and a detection processor coupled to the base band circuitry.

9. A system comprising:
    a radio communication unit configured to perform radio communications within a mobile telecommunication network; and
    the apparatus of claim 1.

10. The apparatus of claim 1, wherein the radio-physical detector is configured to perform continually the obtaining the billing related information from the radio communication unit.

11. The apparatus of claim 1, wherein the radio-physical detector is configured to perform continually the obtaining the billing related information from the radio communication unit with fixed intervals of N seconds, N being 0.1 to 300.

12. The apparatus of claim 1, wherein the radio-physical detector is configured to perform the obtaining the billing related information from the radio communication unit responsively to meeting a predetermined threshold.

13. The apparatus of claim 1, wherein the radio-physical detector is configured to perform the obtaining the billing related information from the radio communication unit responsively to receiving a request for the billing related information from the mobile network.

14. A method in a mobile communication device, comprising:
    communicating with a radio communication unit that is configured to perform radio communications with a base station capable of forming a cell for relaying mobile data between the mobile communication device and a mobile telecommunication network;
    obtaining by radio-physical detection billing related information from the radio communication unit; and
    within a trusted execution environment including a trusted execution environment configured to attest the billing related information by encrypting the billing information to be sent to the mobile telecommunication network:
    obtaining a challenge known by the mobile telecommunication network;
    receiving billing related information;
    attesting billing related information by encrypting the billing information, in response to the challenge;
    causing sending of the attested billing related information to the mobile telecommunication network; and
    using the radio-physical detection to indicate operation of the base station from which the mobile communication device receives radio signals.

15. The method of claim 14, further comprising maintaining in a memory a protocol stack copy.

16. The method of any of claim 15, further comprising sending attested billing related information in batches.

17. The method of claim 15, further comprising storing received billing related information for batch sending of the attested billing related information to the mobile telecommunication network.

18. The method of claim 14, wherein the obtaining by the radio-physical detection of the billing related information from the radio communication unit is performed continually.

19. The method of claim 14, wherein the obtaining by the radio-physical detection of the billing related information from the radio communication unit is performed continually with fixed intervals of N seconds, N being 0.1 to 300.

20. The method of claim 14, wherein the obtaining by the radio-physical detection of the billing related information from the radio communication unit is performed responsively to meeting a predetermined threshold.

* * * * *